United States Patent
Shachar et al.

(10) Patent No.: US 10,607,253 B1
(45) Date of Patent: Mar. 31, 2020

(54) CONTENT TITLE USER ENGAGEMENT OPTIMIZATION

(71) Applicant: Outbrain Inc., New York, NY (US)

(72) Inventors: Amir Shachar, Netanya (IL); Yatir Ben Shlomo, Saba (IL); Alexandra Bennett, Brooklyn, NY (US); Kevin S. Selhi, Brooklyn, NY (US)

(73) Assignee: Outbrain Inc., New York, NY (US)

( * ) Notice: Subject to any disclaimer, the term of this patent is extended or adjusted under 35 U.S.C. 154(b) by 982 days.

(21) Appl. No.: 14/529,667

(22) Filed: Oct. 31, 2014

(51) Int. Cl.
   *G06Q 30/02* (2012.01)
(52) U.S. Cl.
   CPC .................................. *G06Q 30/0244* (2013.01)
(58) Field of Classification Search
   CPC .................................................. G06Q 30/0244
   USPC ........................... 705/14.42–43, 52, 7.37–38
   See application file for complete search history.

(56) References Cited

U.S. PATENT DOCUMENTS

| | | | | |
|---|---|---|---|---|
| 8,050,966 B2* | 11/2011 | Song | .................. | G06Q 30/02 705/14.69 |
| 8,352,466 B2* | 1/2013 | Jones | ................ | G06F 17/30241 707/724 |
| 8,364,523 B2* | 1/2013 | Wee | ....................... | G06Q 30/02 705/14.54 |
| 8,712,856 B2* | 4/2014 | Junger | ................. | G06Q 20/208 705/23 |
| 8,738,436 B2* | 5/2014 | Tuladhar | ............... | G06Q 10/04 705/14.4 |
| 8,869,019 B1* | 10/2014 | Sampath-Kumar | ......................... | G06F 17/2235 715/208 |
| 9,058,242 B2* | 6/2015 | Adams | .................... | G06F 17/00 |
| 9,092,126 B2* | 7/2015 | Misumi | ................. | G06F 3/0485 |
| 9,619,450 B2* | 4/2017 | Alfonseca | .............. | G06F 17/24 |
| 9,881,059 B2* | 1/2018 | Mantrach | ............ | G06F 17/3053 |
| 2009/0049478 A1* | 2/2009 | Kwan | ................. | G06F 17/2264 725/46 |
| 2009/0164268 A1* | 6/2009 | Hogan | .................. | G06Q 30/02 705/14.45 |
| 2009/0265328 A1* | 10/2009 | Parekh | ............. | G06F 17/30864 |
| 2010/0010865 A1* | 1/2010 | Dyer | ................. | G06F 17/30648 705/14.52 |

(Continued)

OTHER PUBLICATIONS

Zhiqiang, et al., Measuring Semantic Similarity between Words using Wikipedia, 2009 Conference on Web Information Systems and Mining, IEEE Computer Society, pp. 251-255.*

(Continued)

*Primary Examiner* — Victoria E Frunzi
(74) *Attorney, Agent, or Firm* — Lowenstein Sandler LLP (57) ABSTRACT

A method and system for generating content title recommendations for content titles associated with a content page is disclosed. The method and system collects user activity data representing user engagement levels relating to multiple content webpages, wherein each content page is associated with a content title. A title replacement candidate is identified in view of the collected user activity data, wherein the title replacement candidate includes a plurality of title components. The title replacement candidate is compared to one or more high user engagement value titles. Based on the comparison, one or more high user engagement title component recommendations are identified which correspond to one or more of the title components of the title replacement candidate.

12 Claims, 6 Drawing Sheets

(56) References Cited

U.S. PATENT DOCUMENTS

| | | | | |
|---|---|---|---|---|
| 2010/0106594 A1* | 4/2010 | Song | ............... | G06Q 30/0243 |
| | | | | 705/14.42 |
| 2012/0143883 A1* | 6/2012 | Chen | ............... | G06F 17/3089 |
| | | | | 707/751 |
| 2014/0052547 A1* | 2/2014 | Ghatare | ........... | G06Q 30/0641 |
| | | | | 705/14.72 |
| 2015/0039416 A1* | 2/2015 | Sullivan | ........... | G06Q 30/0244 |
| | | | | 705/14.43 |
| 2015/0185993 A1* | 7/2015 | Wheatley | ........... | G06F 3/0484 |
| | | | | 715/744 |
| 2016/0335250 A1* | 11/2016 | Breitenbach | ........ | G06F 17/2765 |
| 2017/0316092 A1* | 11/2017 | Fichter | ............. | G06Q 30/0277 |

OTHER PUBLICATIONS

"Analysis of critical aspects to attract online contents" Published Feb. 2014 Author: D. Kanimozhir Rajadurai.*
Huang, Shen, et al., "The Effect of Title Term Suggestion on E-commerce Sites", Ebay Research Labs, Oct. 30, 2008, 8 pages.
Lopez, Cedric, et al., "How Can Catchy Titles be Generated Without Loss of Informativeness?", Elsevier Ltd., 2013, 12 pages.

* cited by examiner

CONTENT TITLE USER ENGAGEMENT OPTIMIZATION

TECHNICAL FIELD

The present disclosure relates to content recommendations and, more particularly, to a technique of recommending content titles to optimize user engagement.

BACKGROUND

In the digital content publishing industry, it is desirable for a content publisher (e.g., a website provider) to present its users or readers not only with interesting, relevant, trustworthy and engaging content in an initial form (e.g., a webpage), but also provide users of the publisher's content with additional recommended content. Furthermore, it is a goal for a content publisher to provide its users with content in a manner which maximizes user engagement and consumption.

An aspect impacting a user's level of engagement with content on a webpage is the title of the content. A piece of digital content possesses and is usually linked to by a title, heading or headline. On many occasions, the wording or phrasing of the content title induces a high degree of interaction with the title/link (i.e., possesses a high user engagement with the title, such as a high Click Through Rate or CTR), but actual user engagement with the underlying content is low. This phenomenon is known in the content marketing industry as "clickbait" and can result in tricking the user to click on the content title in order to maximize the CTR, without any regard to the consequent user engagement with the underlying content. This practice can lead to the loss of user trust in the content publishing source and diminished overall content publisher revenue.

In addition, the reverse phenomenon is also prevalent, wherein content titles having low user engagement levels (e.g., a low CTR) are associated with underlying content that is highly engaging for the relatively few users that have clicked through to the content. In conventional digital publishing, a human editor managing the content of a web page is tasked with inefficiently associating a respective title with various content parameters. However, an automated approach is needed to determine optimal content titles to optimize both user engagement and user trust.

BRIEF DESCRIPTION OF THE DRAWINGS

The present disclosure will be understood more fully from the detailed description given below and from the accompanying drawings of various implementations of the disclosure.

DETAILED DESCRIPTION

A system and method for identifying content title replacement recommendations for titles associated with content of a document is described, according to various implementations. A content provider (also referred to as a "publisher") provides for the publication of content of a document, wherein the content page is represented by a content title. The content title typically serves as a link to the underlying content of the document (also referred to as a "web page" or a "content page"). The publisher and associated web page may be connected to a title recommendation source configured to provide one or more recommendations relating to the title of the content and the content page. A content title may include a number of words, phrases, punctuation marks, symbols, expressions, numbers, terms, etc. collectively referred to as "title components". A content title and title components hereinafter refers to a representation of digital content. A content title represents and identifies underlying content that is accessible by a user and can include one or more of text, a link (e.g., a URL), a thumbnail, an image, an icon, a video, a document, a file, etc. A content page, application page, document or web page hereinafter refers to any electronic presentation of content, including, for example, a browser-generated page, a mobile application graphical user interface (GUI), etc.

In an embodiment, a method and system are provided for determining a high engagement title component recommendation for a title replacement candidate associated with a content page. A title replacement candidate is identified based on a determination that a user engagement measure associated with the title is low (e.g., the title CTR is below a threshold level). According to implementations, recommendations are provided which are designed to increase a user engagement level of the title (e.g., the title CTR) corresponding to the content page. In an implementation, user activity data associated with multiple users relating to multiple content pages and their corresponding content titles in a set is collected. The set of content titles and corresponding content pages may include any number of titles/pages accessible by a user via a network. The collected user activity data includes a set of interactions (e.g., impressions, clicks, selections, visits, views) by one or more users with the multiple content titles and the corresponding content pages of the web page occurring during the activity window. In an implementation, the user activity data may be collected for multiple users on a network during an activity window. The activity window may be any suitable time period, such as, for example, 5 minutes, 1 hour, 5 hours, 24 hours, 25 hours, 1 week, etc.

In an embodiment, based on the collected user activity data, a user engagement measurement (e.g., CTR) is determined for each content title (also referred to herein as the "title engagement level") in a set of titles/content pages. In an embodiment, and a user engagement level (e.g., a user scrolling metric, a time spent on the content page metric, a user read or watched content to completion metric, a user comments metric, a page views after click (PVAC) metric, a user conversion rate metric, or other suitable user attention metrics), also referred to as the "content page engagement level", is determined for each content page in the set of titles/content pages.

The method and system may determine a title replacement candidate for which alternative title components associated with a high user engagement title are identified. One or more alternative title components may be recommended for one or more corresponding components of the title replacement candidate. Advantageously, an editor or other user associated with the content title and content page may update or amend the content title in view of the recommended alternative title components to generate a content title with a high user engagement level and improved trustworthiness. The present disclosure describes efficient and optimal techniques for effectively providing a recommended content title for association with a content page based on collected user activity data.

Figure 1:
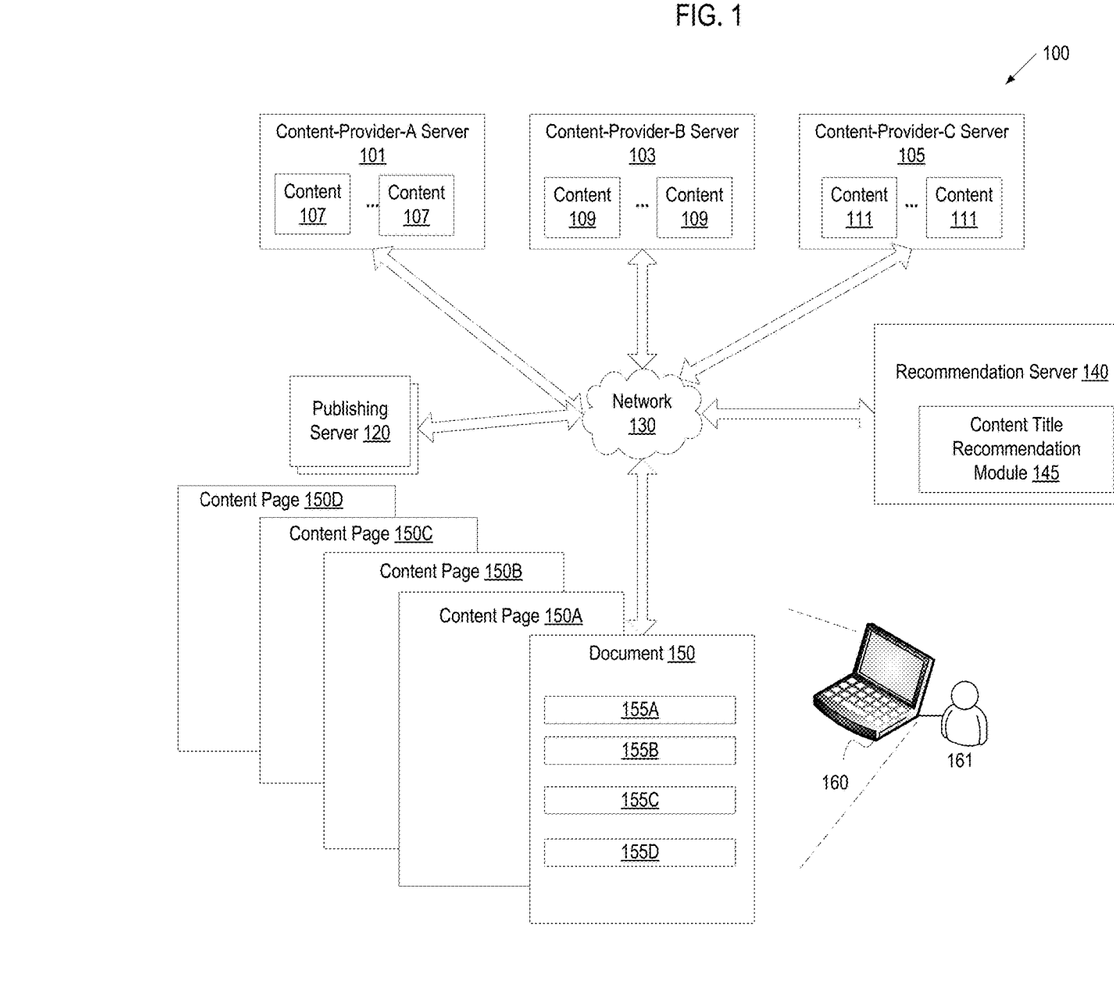
FIG. 1 illustrates an example system architecture in which examples of the present disclosure can be implemented.

FIG. 1 illustrates an example system architecture 100 in which examples of the present disclosure can be implemented. The system architecture 100 can include one or more user devices 160, one or more content provider servers 101,103,105, one or more destination servers (e.g., publishing servers 120) and one or more recommendation servers 140 in communication via one or more networks 130.

A publisher may publish one or more documents or content pages (e.g., document 150) for presenting multiple content links represented by a content title (e.g., content title 155A, content title 155B, content title 155C, and content title 155D) providing a link to a corresponding document or content page (e.g., Content Page 150A, Content Page 150 B, Content Page 150C, and Content Page 150D) to a user (e.g., user 161). For example, content title 155A provides a link to Content Page 150A, content title 155B provides a link to Content Page 150B, content title 155C provides a link to Content Page 150C, and content title 155D provides a link to Content Page 150D. A content title includes any arrangement of words, sentences, terms, phrases, symbols, numbers, punctuation, etc. representing a description or identifier for the associated content page.

In an implementation, the content title may be categorized or associated with a category (e.g., a group, set, classification, type, attribute, or other editorial parameter) based on the subject matter of the content of the underlying content page. Exemplary categories include, but are not limited to, sports, arts, news, science, health, entertainment, breaking news, weather, headlines, top stories, etc.

In an implementation, the one or more content titles (e.g., 155A-155D) may be provided by a publisher associated with Document 150 and/or Content Pages 150A-150D or a content host or provider 101, 103, 105 (herein referred to as the "content sources") having one or more elements of content (e.g., content 107, 109, 111). For example, content title 155B and Content Page 150B may be provided by Content-Provider-B 103 or by a publisher of Document 150.

The content or content page, as represented by a content title in the document, can be a representation of digital content. Digital content can include, for example, such as, and not limited to, an article, a web blog entry, a social media posting, a data feed, an advertisement, a document (e.g., web page), digital video, digital movies, digital photos, digital music, social media updates, electronic books (ebooks), electronic magazines, digital newspapers, digital audio books, electronic journals, electronic comic books, software applications, etc.

The content host or provider 101, 103, 105 includes any entity and/or platform hosting candidate content 107,109, 111 (e.g., content pages, mobile application graphical user interfaces (GUIs), gaming application GUIs, television application GUIs, etc.). For example, SportsNews, Inc. and BaseballNews, Inc. may be content providers. The content provider platforms can include publishing servers 120. The publisher servers 120 can be one or more application servers that provide one or more applications (e.g., web application, mobile application, desktop application, gaming console applications, television console application, etc.). The publishing servers 120 can be coupled to one or more data stores that store publisher data and/or recommendations of content providers. In an implementation, the content providers may wish to publish their respective content 107,109,111 in widespread locations (e.g., Document 150, Content Pages 150A-150D).

In an implementation, a recommendation server 140 communicates with the multiple publishers and content-providers to provide the publishers and content providers with recommendations relating to the content title associated with corresponding content pages. The recommendation service provider can host one or more recommendation servers 140 to provide the service to the content providers and target publishers. The servers 140 include a content title recommendation module 145 configured to determine one or more content title recommendations associated with a given content title. The content title recommendation module 145 is a software component (e.g., a set of instructions residing in a memory) executable by one or more processing devices to perform the exemplary methods described herein (e.g., the methods described in detail in connection with FIGS. 3-4). The instructions of the content title recommendation module 145 may reside in a memory including any suitable computer readable storage medium, such as volatile memory devices (e.g., random access memory (RAM)), non-volatile memory devices (e.g., flash memory), a magnetic hard disk, a Universal Serial Bus (USB) solid state drive, a local disk, an external disk, and/or other types of memory devices).

In an implementation, the network of content providers can include, for example, multiple candidate elements of content and content titles 107,109,111 that may be stored in one or more data stores that are operatively coupled to the network 130. The architecture 100 can include, for example, multiple documents (e.g., Document 150) are accessed by multiple users (e.g., User 161) on various user devices (e.g., user device 160).

The one or more networks 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160 are directly connected to each other. The networks 130 may be separate networks.

In an implementation, exemplary servers 101,103,105, 120, and 140 can be hosted on one or more machines. The machines can include for example, and are not limited to, any data processing device, such as a desktop computer, a laptop computer, a mainframe computer, a server computer or any other device configured to process data.

A user device 160 can be a computing device such as a server computer, a desktop computer, a set-top box, a gaming console, a television, a portable computing device such as, and not limited to, mobile telephones, personal digital assistants (PDAs), portable media players, netbooks, laptop computers, a tablet computer, an electronic book reader, a wearable electronic device and the like.

Figure 2:
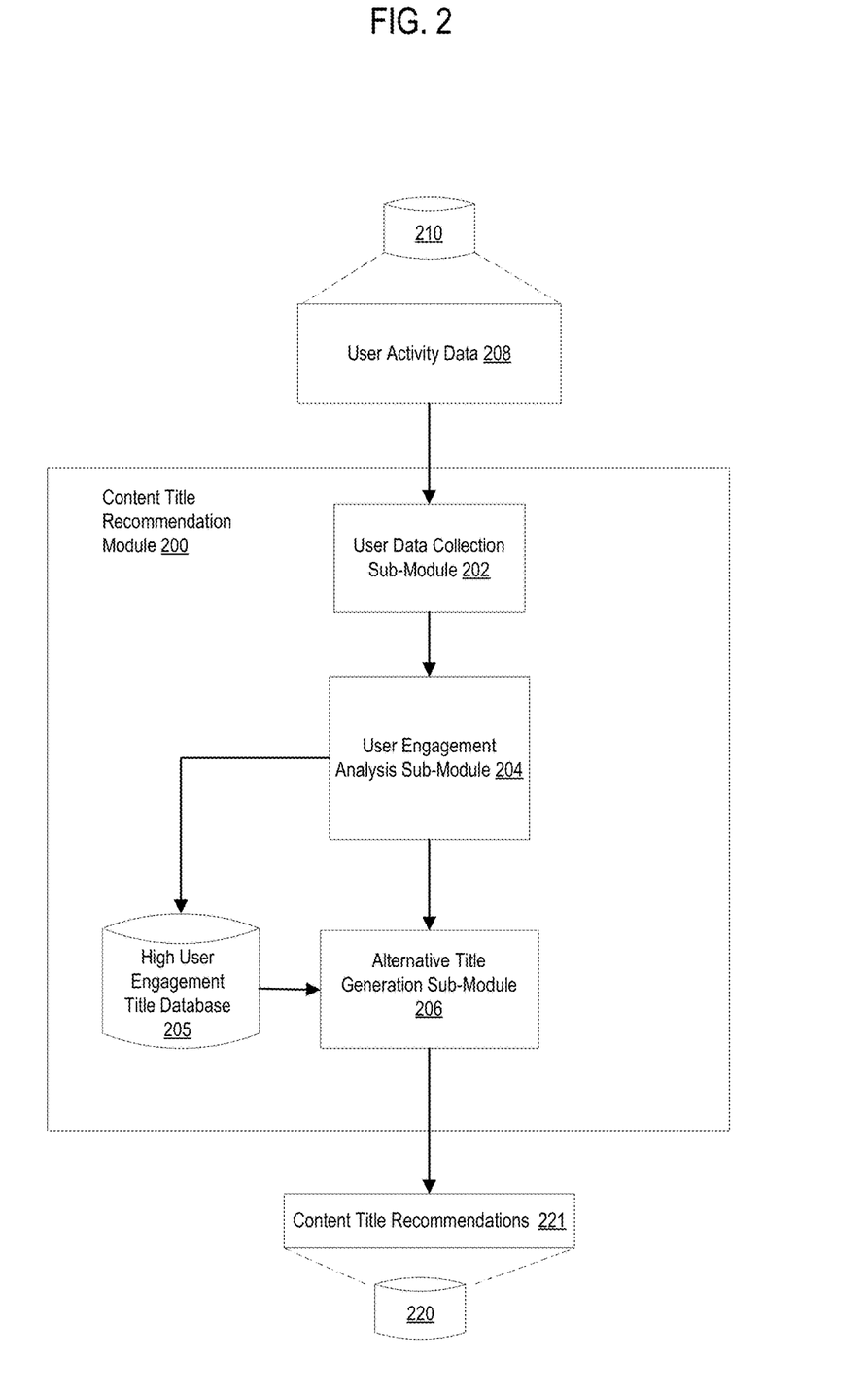
FIG. 2 is a block diagram of a content title recommendation module, according to implementations of the present disclosure.

FIG. 2 is a block diagram of a content title recommendation module 200 (e.g., content title recommendation module 145 of FIG. 1), in accordance with various implementations of the present disclosure. The content title recommendation module 200 can include a user data collection sub-module 202, a user engagement analysis sub-module 204, an alternative title generation sub-module 206, and a high user engagement title database 205. Note that in alternative implementations, the functionality of one or more of the user data collection sub-module 202, the user engagement analysis sub-module 204, the alternative title generation sub-module 206, and the high user engagement title database 205 may be combined into one or more modules or divided into multiple modules. Note that in alternative implementations, the functionality of the content title recommendation module 200 can be in any number of separate modules.

The content title recommendation module 200 can be coupled to one or more data stores 205, 210 and 220 configured to store data. In an implementation, the data stores 205, 210, and 220 can be persistent storage units. A persistent storage unit can be a local storage unit or a remote storage unit. Persistent storage units can be a magnetic storage unit, optical storage unit, solid-state storage unit, electronic storage units (main memory), or similar storage unit. Persistent storage units can be a monolithic device or a distributed set of devices. A 'set', as used herein, refers to any positive whole number of items.

The data stores 205, 210 and 220 can store input and/or output data. The modules (e.g., user data collection sub-module 202, the user engagement analysis sub-module 204, and the alternative title generation sub-module 206) can be operatively coupled to the one or more data stores 205, 210 and 220 and can read from and write to the one or more data stores 205, 210 and 220.

According to implementations of the present disclosure, data store 210 is configured to store user activity data 208 collected for and by the user data collection sub-module 202. The user activity data may include information relating to user activity relating to one or more content pages and associated content titles presented on web pages of a network. According to implementations, the user activity includes any data relating to multiple users' digital content consumption history pertaining to content pages represented by corresponding content titles. As detailed above, the user activity data may include any implicit or explicit data associated with a user's digital actions or activity including, but not limited to, clicks, visits, impressions, page views, time spent on a content page, the amount of page content viewed, interactions, pointing to content link, viewing a content link but not interacting with the content link (e.g., by hovering over the link), special interest indicators such as "thumbs up" indications or "thumbs down" indications, any metric associated with a user engagement level, etc.

The user activity data may be collected for any quantity of users via any suitable methodology. For example, user activity data from multiple users may be collected by the user data collection sub-module 202 by storing a user identifier (e.g., a cookie stored on the user's browser) and/or using a user login (e.g., wherein a user is associated with login credentials which enable the collection of user data for that user across multiple devices and browsers). According to implementations, the user activity data may be collected on a persistent and ongoing basis such that the user data collection sub-module continually captures updated information regarding the activities of the users on a network during an identified activity window. In an implementation, the user activity data may be collected "offline" relative to the provisioning of content title recommendations (e.g., as an ongoing backend process supplementing the source-related user activity measurement calculation process). In an implementation, the user data collection sub-module 202 provides the collected user activity data 208 to the communicatively coupled user engagement analysis sub-module 204 for further processing, as described in detail below.

According to implementations, the user data collection sub-module 202 is configured to identify user activity data relating to a set of content pages and content titles. Optionally, the user data collection sub-module 202 may collect the user activity data 208 during an activity window. In an embodiment, the activity window may be any suitable time period, such as, for example, 24 hours, 25 hours, etc. For example, the collected user activity data 208 may include a set of interactions by one or more users with a content link during each activity window, wherein a total count or quantity and types or quality of interactions relating to each content title and corresponding content pages during the activity window may be determined.

According to implementations of the present disclosure, the user engagement analysis sub-module 204 is configured to analyze the user activity data 208 to identify one or more title replacement candidates among the multiple content titles of the set of user activity data 208. In an implementation, the user engagement analysis sub-module 204 is configured to determine a user engagement level associated with each content page (e.g., a content page engagement level) and content title (e.g., a title engagement level) of the set of collected user activity data.

In an implementation, the user engagement analysis sub-module 204 may identify one or more high user engagement titles and high user engagement content pages and store information associated with the high user engagement titles and high user engagement content pages in the high user engagement title database 205. In an implementation, a high user engagement title may be identified by comparing an engagement level associated with a particular content title (determined based on the collected user activity data) to a title engagement threshold. In instances when the actual engagement level of the content title is higher than the title engagement threshold, the corresponding content title is identified as a high user engagement title. In an implementation, the corresponding content title may be identified as a high user engagement title if the actual engagement level of the content title is higher than the title engagement threshold by an identified amount or percentage (e.g., 10%, 20%, etc.).

Similarly, according to an implementation, a high user engagement content page may be identified by comparing an engagement level associated with a particular content page (determined based on the collected user activity data) to a content page engagement threshold. In an implementation, in instances when the actual engagement level of the content page is higher than the content page engagement threshold, the corresponding content page is identified as a high user engagement content page.

In an implementation, the user engagement analysis sub-module 204 may be configured to identify one or more title replacement candidates from among the content titles analyzed in the collected user activity data. In an implementation, a title replacement candidate is a content title selected to undergo further processing to determine one or more recommendations for replacing components of the title replacement candidate.

In an implementation, the one or more title replacement candidates may be identified by determining a user engagement level divergence based on the collected user activity data. In an implementation, the user engagement level divergence is identified if a particular content page is associated with a high content engagement level, but has a low title engagement level. In this example, the title replacement candidate may have a content engagement level exceeding the content page engagement threshold and also have a title engagement level below the title engagement threshold, thereby representing a divergence between the two engagement levels associated with the content page.

In an implementation, the user engagement analysis sub-module 204 may provide information relating to title replacement candidates to the alternative title generation sub-module 206. In an implementation, the alternative title generation sub-module 206 is configured to the determined engagement levels for the various content pages and content titles. In an implementation, the alternative title generation sub-module 206 compares and matches each title replacement candidate to one or more high user engagement value titles. High user engagement value titles are content titles having a title engagement level exceeding the title engagement threshold by a predefined amount or percentage (e.g., 5%, 10%, 20%, etc.) It is noted that the determination of a high user engagement value title may be based on any suitable comparison to the title engagement threshold. In an implementation, the alternative title generation sub-module 206 may receive collected engagement levels associated with the content titles and content pages from the high user engagement title database 205.

In an implementation, the alternative title generation sub-module 206 determines one or more content title recommendations 221 associated with each of the one or more title replacement candidates. As described in greater detail below, the alternative title generation sub-module 206 may parse the title replacement candidate into a plurality of title components (e.g., words, phrases, punctuation, symbols, numbers, etc.) and recommend replacement or alternative title components from one or more high user engagement titles.

In an implementation, the alternative title generation sub-module 206 might identify high engagement titles that are similar or related to the title replacement candidate without parsing or breaking down the title replacement candidate into its title components. These related high user engagement titles can be provided verbatim to the user as illustrative examples to help trigger the user to compose a more engaging title.

In an implementation, the alternative title generation sub-module 206 may store the one or more content title recommendations 221 including the alternative titles or title components in a data store (e.g., data store 220) and may provide the alternative title components to a user. In an implementation, the alternative title generation sub-module 206 may generate a list of alternative title components associated with a title replacement candidate and provide the list to a user. In an implementation, the alternative title generation sub-module 206 may filter the list of alternative title components, as described in greater detail below. In an implementation, the alternative title generation sub-module 206 may perform the exemplary methods described in detail in connection with FIGS. 3 and 4.

According to implementations, the content title recommendation module 200 may determine content title recommendations 221 for multiple content pages and corresponding content titles, as described below in detail with regard to FIGS. 3, 4 and 5.

Figure 3:
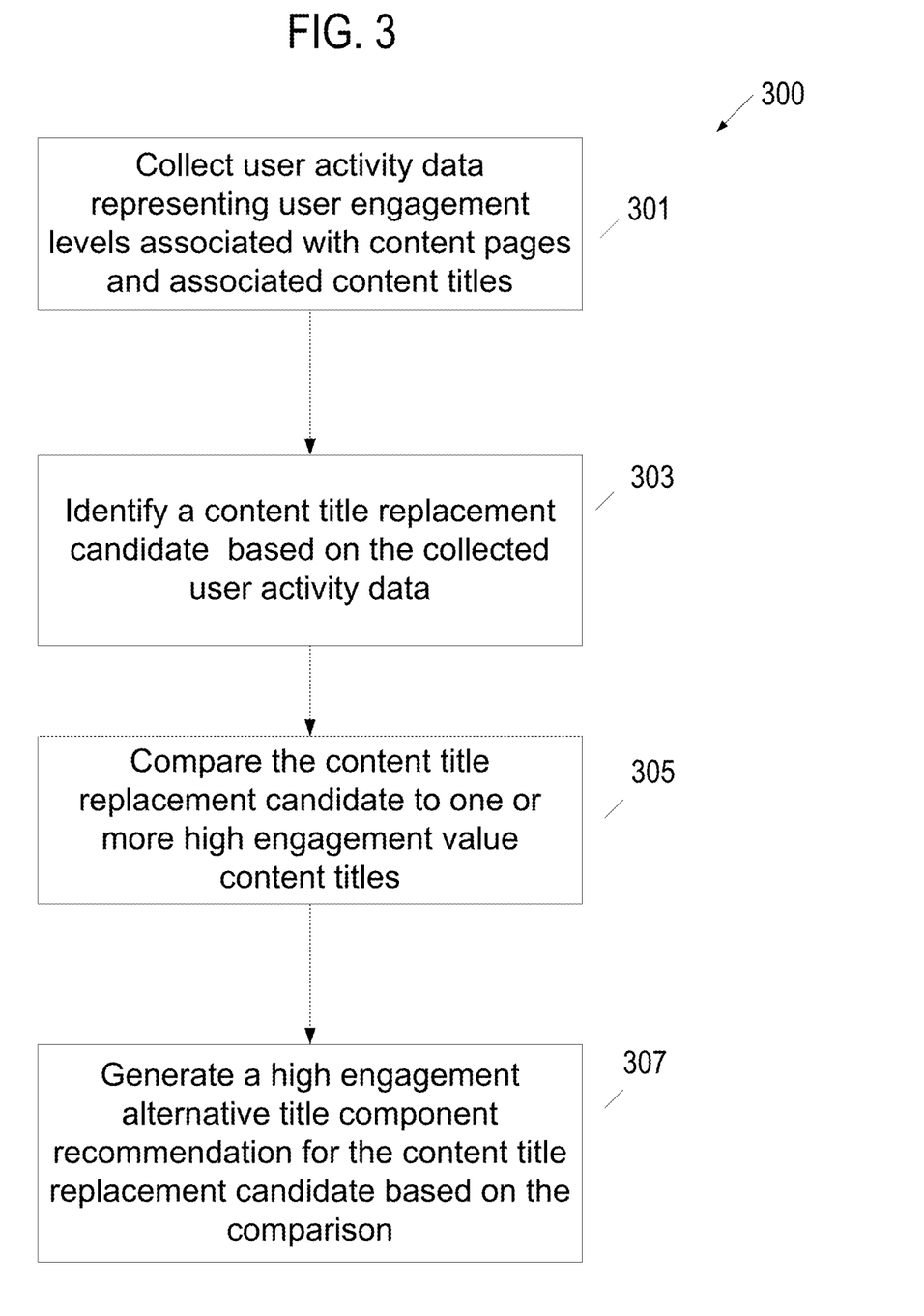
FIG. 3 is a flow diagram of an implementation of a method to generate one or more high engagement content title recommendations, according to implementations of the present disclosure.

FIG. 3 is a flow diagram of an exemplary implementation of a method 300 for generating one or more high user engagement level alternative title or title component for a title replacement candidate associated with a content page. The method may be performed by processing logic that may comprise hardware (circuitry, dedicated logic, etc.), software (such as is run on a general purpose computer system or a dedicated machine), or a combination of both. In an implementation, the method 300 may be performed by the content title recommendation module 145 hosted in a server 140 of FIG. 1 or by the content title recommendation module 200 illustrated in FIG. 2.

At block 301, the content title recommendation module collects a set of user activity data representing user engagement levels associated with content pages and related content titles accessible by multiple users of a network. In an implementation, the user activity data includes any information relating to the multiple users activity that may be used to determine a user engagement level associated with the content pages and the content titles. At block 303, a title replacement candidate is identified from among the content titles of the collected user activity data. In an implementation, the title replacement candidate may be identified by analyzing the user engagement levels of the content page and content title of the title replacement candidate, calculated based on the collected user activity data. According to the present disclosure, any suitable user engagement level metric associated with a content page may be determined, such as, for example, a user scrolling metric, a time spent on the content page metric, a user read or watched content to completion metric, a user comments metric, a page views after click (PVAC) metric, a user conversion rate metric, or any other suitable user attention metric.

In an implementation, the title replacement candidate may be identified by determining a user engagement level divergence associated with the corresponding content page and content title. The user engagement divergence may be identified based on the collected user activity data—and represents a content page having a high content engagement level and a low title engagement level. In an implementation, the title replacement candidate is associated with a content page having a content engagement level exceeding a content engagement threshold and a content title having a title engagement level below a title engagement threshold.

At block 305, the title replacement candidate is compared to one or more high user engagement value titles. In an implementation, the high user engagement value titles may be other identified content titles that have a high user engagement level determined based on the collected user activity data. In an implementation, the title replacement candidate may be compared to related high user engagement value titles using rule-based natural language processing techniques (for e.g., noun phrase extraction). A high user engagement value title may be considered related to the title replacement candidate if the titles are in a same content category, are contextually related, and/or are semantically similar. It is noted that the contextual similarity and semantic similarity of a high user engagement value title and a title replacement candidate may be determined according to any suitable analytical model, approach, or framework known in the art. In an implementation, semantic similarity may be determined using rule-based natural language processing techniques to identify title component parallels within the body text of the content page associated with the title. In an implementation, the high user engagement value title and a title replacement candidate may be paired by filtering them using similar target user audience criteria (for e.g., by user age, location, demographic, user preferences) and a target publisher type.

At block 307, one or more high user engagement alternative title component recommendations may be generated for one or more components of the title replacement candidate. The high user engagement alternative title component recommendations may include a word, term, phrase, symbol, etc. from an identified high user engagement value title that may be used to replace a component of the title replacement candidate. In an implementation, a high user engagement title component recommendation may include an alternative action, such as deleting a component from the title replacement candidate, emphasizing a component from the title replacement candidate (e.g., bolding, italicizing, etc.), or re-ordering multiple components of the title replacement candidate. In an implementation, at block 307, the generated high user engagement content title or title component recommendations may be presented to a user in list form.

Figure 4:
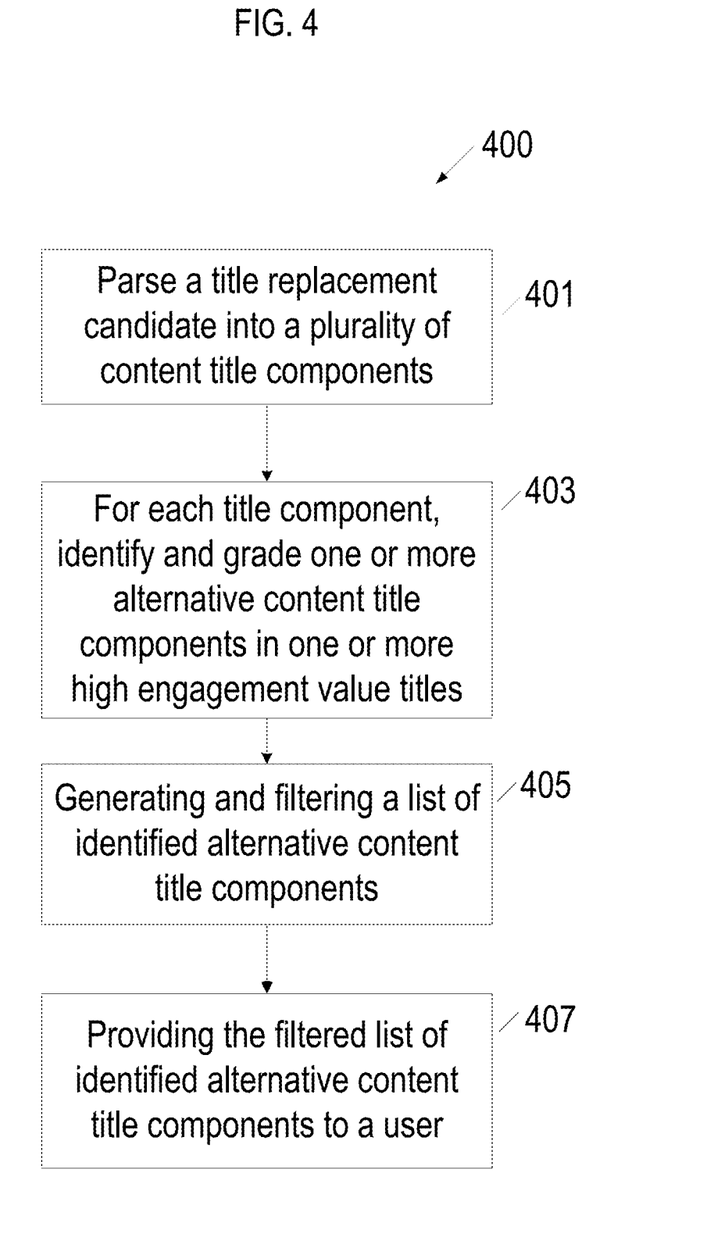
FIG. 4 illustrates an exemplary method to generate and provide a filtered list of alternative content title components for identifying a high user engagement content title, according to implementations of the present disclosure.

FIG. 4 is a flow diagram of an exemplary implementation of a method 400 to compare a title replacement candidate to one or more high user engagement value titles and generate a high user engagement alternative title component recommendation. The method 400 may be performed by processing logic that may comprise hardware (circuitry, dedicated logic, etc.), software (such as is run on a general purpose computer system or a dedicated machine), or a combination of both. In an implementation, the method 400 may be performed by the content title recommendation module 145 hosted in a server 140 of FIG. 1 or by the content title recommendation module 200 illustrated in FIG. 2.

At block 401, the content title recommendation module parses a title replacement candidate into multiple title components. As described above, the title components may include one or more words, phrases, punctuation marks, symbols, expressions, terms, etc. FIG. 5 illustrates an exemplary title replacement candidate 501 reciting "Wow—A new Fermion is discovered". As shown in FIG. 5, the title replacement candidate 501 is parsed into title components 1-7, as represented in table 550.

In an implementation, at block 403, for each title component 1-7, one or more alternative title components from one or more high user engagement value titles are identified. As described above in connection with FIG. 3, high user engagement value titles are identified based on the collected user activity data.

In an implementation, for each title component (i.e., word, word pair, phrase or sentence) a search is performed of a data store including the one or more high user engagement value titles (e.g., high user engagement title database 205 of FIG. 2) for similar alternative title components (i.e. synonymic words, word pairs, phrases or sentences). In an implementation, a determination may be made of contextually related and semantically similar high user engagement titles using a filter, such as a common category filter, a cross-reference to a dictionary resource or thesaurus resource to identify synonyms, or by vector mapping the distance between pairs or clusters of similar titles. As described above, each content title (i.e., the title replacement candidate and the high user engagement level titles) may be categorized or associated with a category (e.g., a group, set, classification, type, attribute, or other editorial parameter) based on the subject matter of the content of the underlying content page. Exemplary categories include, but are not limited to, sports, arts, news, science, entertainment, health, breaking news, weather, headlines, top stories, etc. In an implementation, the title replacement candidate may be compared to high user engagement titles that are in the same category as the title replacement candidate.

In an example, a synonymous word can be identified in related high user engagement titles (i.e., a title having an high engagement value (e.g., a CTR value)).

In an implementation, the alternative title components (e.g., synonymous words, terms, phrases, etc.) are graded. For example, each title component grade may be calculated by the following expression:

$$\text{Grade(component)} = \text{ctr(component)}/\text{docFreq(component)};$$

wherein, the ctr(component) is the total number of times a content title containing the title component was clicked on by the users and the docFreq(component) represents the total number of times the content title containing the title component was shown as an impression to users throughout the content network.

In an implementation, each title component can be graded separately for every referring content category by the following expression:

$$\text{Grade(component,category)} = \text{ctr(component,category)}/\text{docFreq(component)};$$

For example, the title component "Lady Gaga" can have a high grade in an entertainment related category but a low grade in a religion related category.

In an implementation, the grade can also include the number of unique publishers or sources in which the title component appeared in, by using the following expression:

$$\text{Grade(component,category)} = \text{ctr(component,category)} * \text{numUniquePublishers(component)}^3/\text{docFreq(component)}^2;$$

For example, highly interesting topics (for e.g., "Robin Williams Dies" or "Malaysian Flight 370" or "George Clooney Weds") can be identified by the fact that they appear on many different publisher platforms, indicating high engagement on that topic by many editors from different media outlets.

In an implementation, the graded alternative title component may then be matched to a corresponding component of the title replacement candidate. In an implementation, the graded list of alternative title components may be used to rank the list of matching high user engagement titles in which the alternative title components are found.

Figure 5:
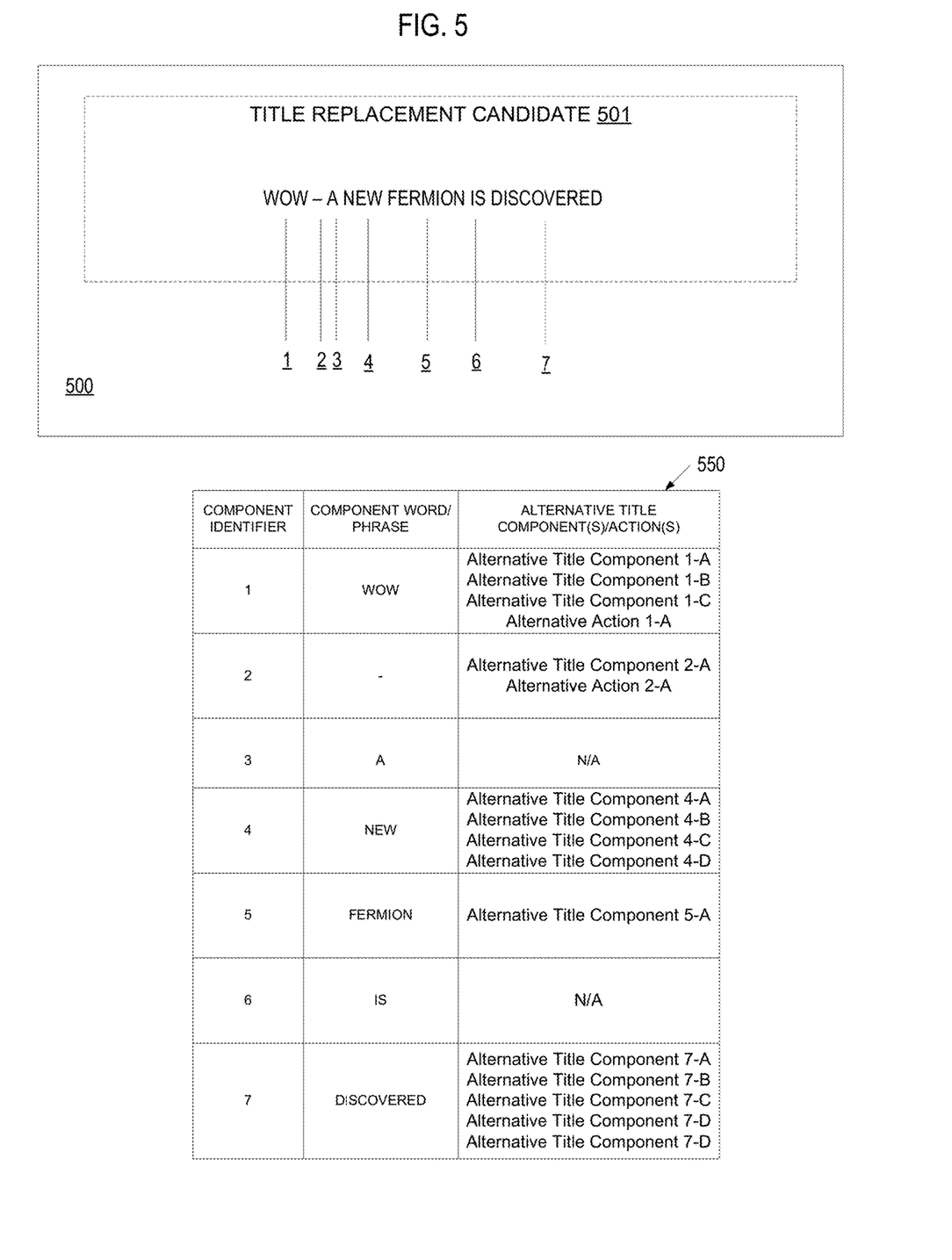
FIG. 5 illustrates an exemplary content title replacement candidate and a corresponding list of alternative content title components and actions generated in accordance with implementations of the present disclosure.

As shown in FIG. 5, the table 550 presents the components of the title replacement candidate 501 in association with one or more alternative title components and/or alternative title actions. In an example, the "Wow" symbol (component 1) of the title replacement candidate 501 is associated with an alternative title components 1-A, 1-B, and 1-C (e.g., the components "Amazing", "Eureka", "Remarkable") and an alternative action 2-A (e.g., remove or delete the component). In implementations of the present disclosure, an alternative action may include a "negative" recommendation, such as a recommendation to remove certain components from the title replacement candidate.

At block 405 of FIG. 4, a list of identified alternative title components is generated. For example, the table 550 in FIG. 5 represents a list associating the components of the title replacement candidate 501 and various alternative title components identified at block 403 of FIG. 4. In an implementation, the list may be filtered to present a ranked list of alternative title components. In an implementation, the generated list may be filtered by category suitability (e.g., content category or subject matter similarity/matching). In an implementation, statistical data relating to each title category and additional parameters and data (e.g., demographic, geographic, linguistic) may be used to filter the list of alternative title components. In an implementation, a filter may be applied to decrease a position on the list for "generic" components in the list of alternative title components list. In an implementation, a filter may be applied to increase a position on the list for or high user engagement components (e.g., the words "exclusive", "warning", "worst", "photo", "never", "lie", "surprise", "who", "dollar", "don't", "hot", etc.). It is noted that a user may select any components (e.g., words or phrases) that he or she wishes to flag as high user engagement and apply the high user engagement filter to rank the alternative title components on the list.

With reference to FIG. 4, at block 407, the filtered list of identified alternative title components is provided to a user. In an implementation, the content title recommendation module notifies a content owner or publisher of the alternative title components (derived from the high user engagement titles) that are recommended for increasing the user engagement (e.g., a CTR level) of the title replacement candidate (i.e., the original content title). According to implementation of the present disclosure, the notification alerts a user that the title replacement candidate has a low title engagement level while the underlying content page has a high content engagement level.

In an implementation, the notification identifies the alternative title components and/or the alternative title action (e.g., removing components associated with a low title engagement level, such as, for example, the words "you", "need", "always", "watch", "easy", "how to", etc.).

In an implementation, the notification may be deployed over an identified period of time in the form of a "tip" (e.g., presented as a "tip of the day" or as part of a periodic service newsletter). In an implementation, a full example showing the recommendation alternative title components in place of the title components of the title replacement candidate may be presented to the user. In an implementation, related high user engagement titles can be provided verbatim to the user as illustrative examples to help trigger the user to compose a more engaging title. In an implementation, the user is provided with the option to simultaneously test multiple versions of the content title replacement candidates and determine their user engagement performance.

In an implementation, the content title recommendation module further tracks the engagement level associated with changed, updated, or amended titles in accordance with the title recommendations and tracks and measures and increase to the title engagement level by comparing the title engagement level of the title replacement candidate to the title engagement level of the changed title.

In an implementation, the system also provides user engagement performance feedback about the content title replacements to the content owner or publisher (for e.g., data about any increases in CTR due to the recommended title changes being implemented).

Figure 6:
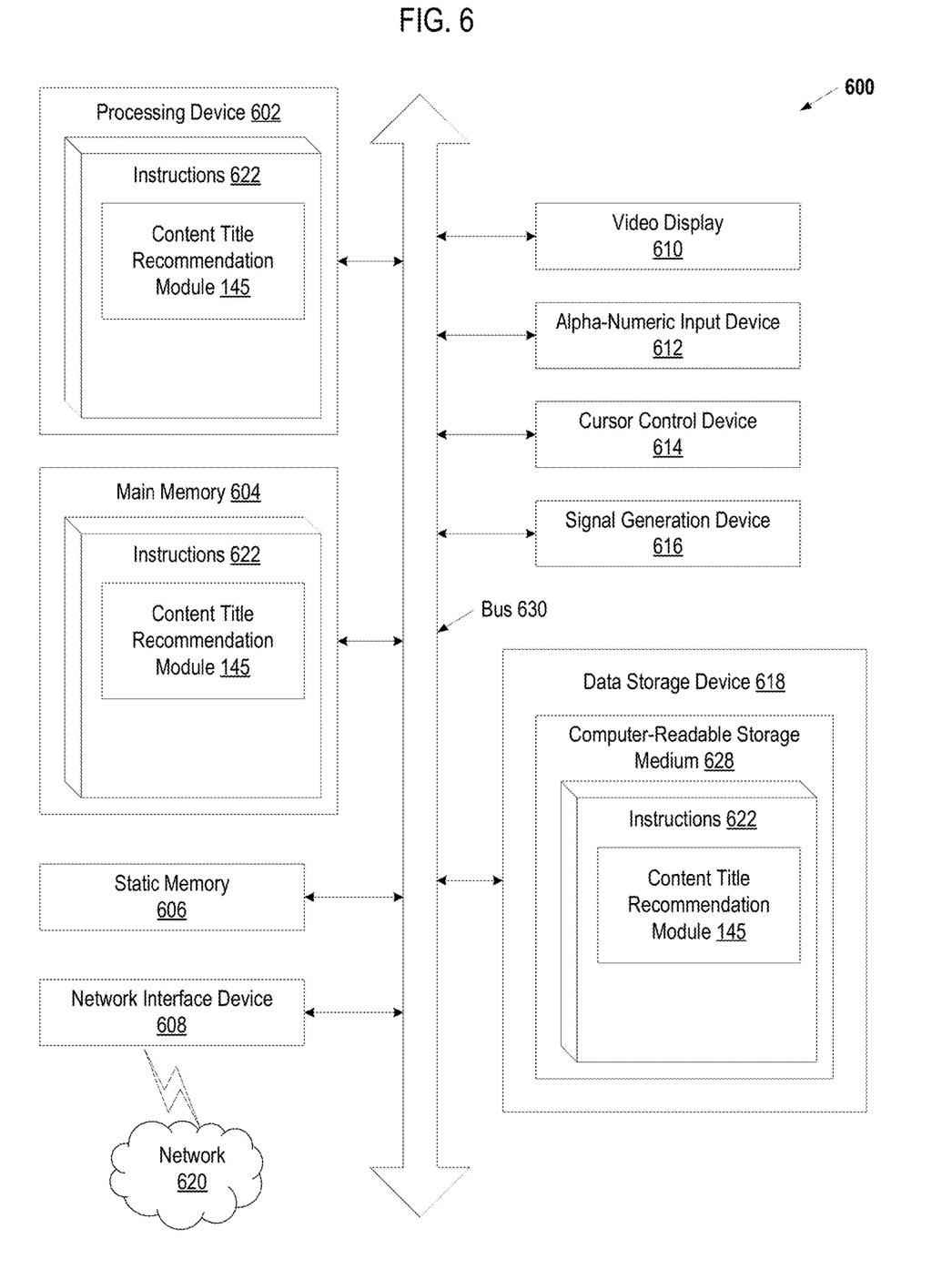
FIG. 6 is a block diagram of an example computer system that may perform one or more of the operations described herein, according to implementations of the present disclosure.

FIG. 6 is a block diagram of an example computer system 600 that may perform one or more of the operations described herein, in accordance with various implementations In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (e.g., a processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one implementation, the instructions 622 include instructions for a module (e.g., content title recommendation module 145 in FIG. 1) and/or a software library containing methods that call the optimization module. While the computer-readable storage medium 628 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "identifying", "comparing", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete and teachable fashion.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

collecting, from a plurality of webpages communicatively connected to a processing device of a server, user activity data representing user engagement levels indicated by electronic interactions by a plurality of user computing systems accessing, via a network, a plurality of content page and content title pairs, wherein a first content page of the plurality of content pages is paired with a first content title;

storing, by the processing device, the user activity data in one or more databases;

retrieving, by the processing device of the server from the user activity data stored in the one or more database, first user activity data relating to a first user engagement level associated with the first content page;

retrieving, by the processing device of the server from the user activity data stored in the one or more databases, second user activity data relating to a second user engagement level associated with the first content title;

determining, based on the user activity data, the first user engagement level associated with the first content page is above a content engagement threshold;

determining, based on the user activity data, the second user engagement level associated with the first content title is below a title engagement threshold;

identifying, by the processing device, a condition wherein both the first user engagement level of the first content page is above the content engagement threshold and the second user engagement level of the first content title is below the title engagement threshold;

in response to identifying the condition, selecting the first content title as a title replacement candidate;

matching the first content title of the title replacement candidate to one or more high user engagement value titles stored in the one or more databases;

filtering, by a processing device, one or more high user engagement title component recommendations corresponding to one or more of a plurality of title components of the title replacement candidate in view of the matching;

receiving, by the processing device, a selection of a first high user engagement title component recommendation to replace a first component of the first content title;

in response to the selection, generating a modified content page comprising an updated content title comprising the first high user engagement title component recommendation;

receiving a request from a user computing system for the first content page;

causing, in response to a request from a user computing system for the first content page, a display to the user computing system of the modified content page comprising the updated content title; and collecting, by the processing device of the server, additional user data comprising second user activity data indicating a third user engagement level associated with the first content page paired with the updated content title, wherein the third user engagement level is higher than the first user engagement level.

2. The method of claim 1, further comprising:

parsing the title replacement candidate to identify the plurality of title components;

for each title component, identifying one or more alternative title components in one or more high user engagement value titles; and generating a list of identified alternative title components associated with the title replacement candidate.

3. The method of claim 2, further comprising:

filtering the list of identified alternative title components; and causing a display of the filtered list of identified alternative title components to a user.

4. The method of claim 2, wherein the one or more high user engagement value titles are in a same category as the title replacement candidate.

5. A system comprising:

a memory comprising instructions; and a processing device operatively coupled to the memory, the processing device configured to execute the instructions to perform operations comprising:

collecting, from a plurality of webpages communicatively connected to the processing device of a server, user activity data representing user engagement levels indicated by electronic interactions by a plurality of user computing systems accessing, via a network, a plurality of content page and content title pairs, wherein a first content page of the plurality of content pages is paired with a first content title;

storing, by the processing device, the user activity data in one or more databases;

retrieving, by the processing device of the server from the user activity data stored in the one or more database, first user activity data relating to a first user engagement level associated with the first content page;

retrieving, by the processing device of the server from the user activity data stored in the one or more databases, second user activity data relating to a second user engagement level associated with the first content title;

determining, based on the user activity data, the first user engagement level associated with the first content page is above a content engagement threshold;

determining, based on the user activity data, the second user engagement level associated with the first content title is below a title engagement threshold;

identifying, by the processing device, a condition wherein both the first user engagement level of the first content page is above the content engagement threshold and the second user engagement level of the first content title is below the title engagement threshold;

in response to identifying the condition, selecting the first content title as a title replacement candidate;

matching the first content title of the title replacement candidate to one or more high user engagement value titles stored in the one or more databases;

filtering, by a processing device, one or more high user engagement title component recommendations corresponding to one or more of a plurality of title components of the title replacement candidate in view of the matching;

receiving, by the processing device, a selection of a first high user engagement title component recommendation to replace a first component of the first content title;

in response to the selection, generating a modified content page comprising an updated content title comprising the first high user engagement title component recommendation;

receiving a request from a user computing system for the first content page;

causing, in response to a request from a user computing system for the first content page, a display to the user computing system of the modified content page comprising the updated content title; and collecting, by the processing device of the server, additional user data comprising second user activity data indicating a third user engagement level associated with the first content page paired with the updated content title, wherein the third user engagement level is higher than the first user engagement level.

6. The system of claim 5, the operations further comprising:

parsing the title replacement candidate to identify the plurality of title components;

for each title component, identifying one or more alternative title components in one or more high user engagement value titles; and generating a list of identified alternative title components associated with the title replacement candidate.

7. The system of claim 6, the operations further comprising:

filtering the list of identified alternative title components; and causing a display of the filtered list of identified alternative title components to a user.

8. The system of claim 6, wherein the one or more high user engagement value titles are in a same category as the title replacement candidate.

9. A non-transitory computer readable storage medium comprising instructions that, in response to execution by a processing device, cause the processing device to perform operations comprising:

collecting, from a plurality of webpages communicatively connected to the processing device of a server, user activity data representing user engagement levels indicated by electronic interactions by a plurality of user computing systems accessing, via a network, a plurality of content page and content title pairs, wherein a first content page of the plurality of content pages is paired with a first content title;

storing, by the processing device, the user activity data in one or more databases;

retrieving, by the processing device of the server from the user activity data stored in the one or more database, first user activity data relating to a first user engagement level associated with the first content page;

retrieving, by the processing device of the server from the user activity data stored in the one or more databases, second user activity data relating to a second user engagement level associated with the first content title;

determining, based on the user activity data, the first user engagement level associated with the first content page is above a content engagement threshold;

determining, based on the user activity data, the second user engagement level associated with the first content title is below a title engagement threshold;

identifying, by the processing device, a condition wherein both the first user engagement level of the first content page is above the content engagement threshold and the second user engagement level of the first content title is below the title engagement threshold;

in response to identifying the condition, selecting the first content title as a title replacement candidate;

matching the first content title of the title replacement candidate to one or more high user engagement value titles stored in the one or more databases;

filtering, by a processing device, one or more high user engagement title component recommendations corresponding to one or more of a plurality of title components of the title replacement candidate in view of the matching;

receiving, by the processing device, a selection of a first high user engagement title component recommendation to replace a first component of the first content title;

in response to the selection, generating a modified content page comprising an updated content title comprising the first high user engagement title component recommendation;

receiving a request from a user computing system for the first content page;

causing, in response to a request from a user computing system for the first content page, a display to the user computing system of the modified content page comprising the updated content title; and collecting, by the processing device of the server, additional user data comprising second user activity data indicating a third user engagement level associated with the first content page paired with the updated content title, wherein the third user engagement level is higher than the first user engagement level.

10. The non-transitory computer readable storage medium of claim 9, the operations further comprising:

parsing the title replacement candidate to identify the plurality of title components;

for each title component, identifying one or more alternative title components in one or more high user engagement value titles; and generating a list of identified alternative title components associated with the title replacement candidate.

11. The non-transitory computer readable storage medium of claim 10, the operations further comprising:

filtering the list of identified alternative title components; and causing a display of the filtered list of identified alternative title components to a user.

12. The non-transitory computer readable storage medium of claim 10, wherein the one or more high user engagement value titles are in a same category as the title replacement candidate.

* * * * *